United States Patent [19]
Dorsey et al.

[11] 3,919,472

[45] Nov. 11, 1975

[54] AUTOMATIC TARGET CONTROL SYSTEM FOR A TELEVISION CAMERA TUBE

[75] Inventors: Denis Peter Dorsey, Levittown, Pa.; William E. Rodda; Ralph Stuart Filson, both of Trenton, N.J.

[73] Assignee: RCA Corporation, New York, N.Y.

[22] Filed: Nov. 12, 1973

[21] Appl. No.: 414,755

[52] U.S. Cl. .................................. 178/7.2; 178/29

[51] Int. Cl.$^2$ .......................................... H04N 5/38

[58] Field of Search ...................... 178/7.2, DIG. 29; 315/31 TV

[56] References Cited

UNITED STATES PATENTS

| | | | |
|---|---|---|---|
| 3,180,934 | 4/1965 | Altman et al. | 178/DIG. 29 |
| 3,578,908 | 5/1971 | Tompkins | 178/DIG. 29 |
| 3,652,792 | 3/1972 | Usagawa | 178/DIG. 29 |

*Primary Examiner*—Richard Murray
*Assistant Examiner*—Aristotelis M. Psitos
*Attorney, Agent, or Firm*—E. M. Whitacre; M. DeCamillis

[57] ABSTRACT

An automatic target control system for a television camera tube utilizing peak-to-peak detection of developed output signals and a low impedance driving source to enhance the accuracy and speed with which detection is provided.

5 Claims, 1 Drawing Figure

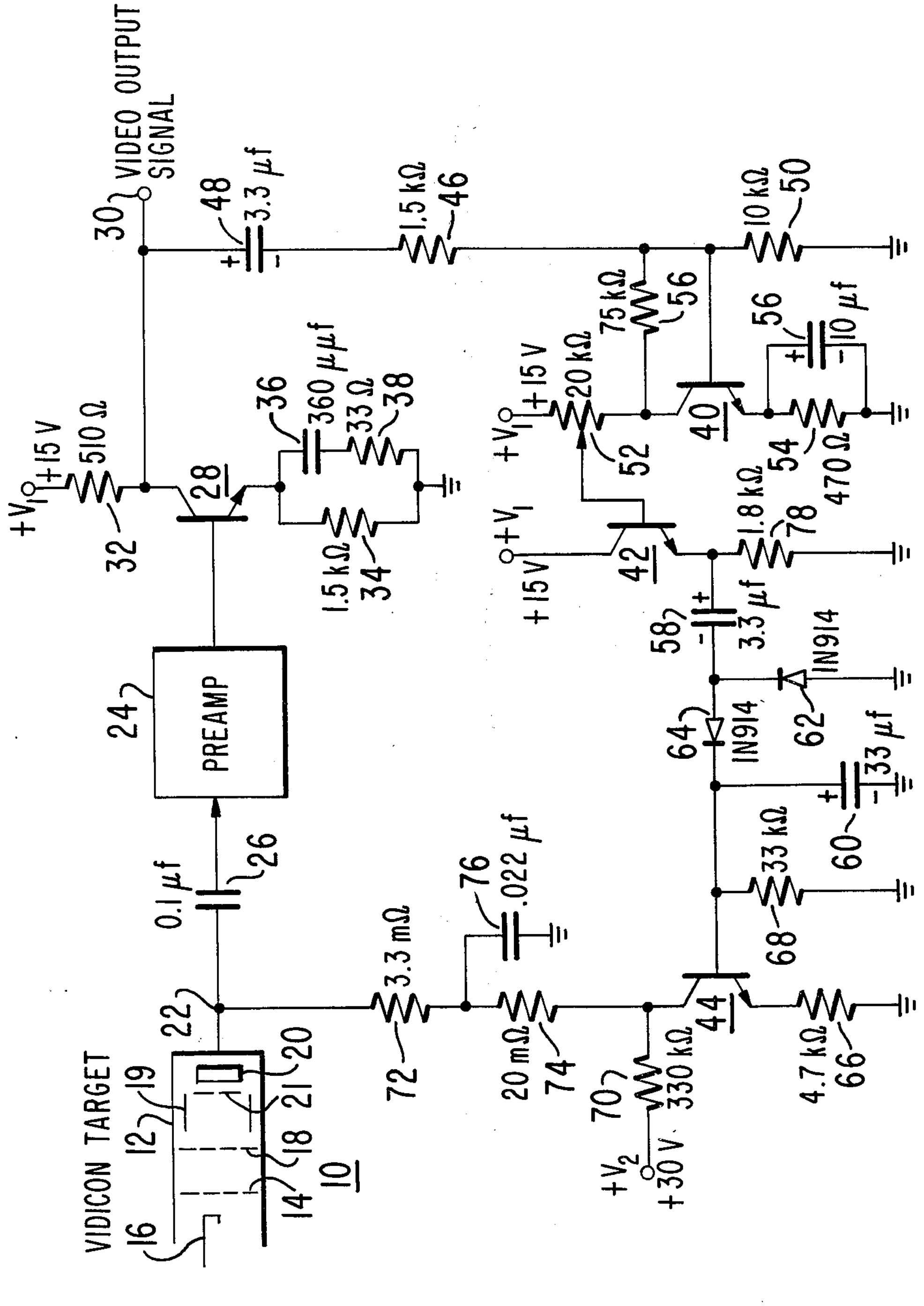
VIDEO OUTPUT SIGNAL
PREAMP
VIDICON TARGET
+15 V
510 Ω
360 μμf
33 Ω
1.5 kΩ
3.3 μf
10 kΩ
75 kΩ
20 kΩ
10 μf
470 Ω
1.8 kΩ
IN914
33 μf
33 kΩ
0.1 μf
3.3 mΩ
.022 μf
20 mΩ
330 kΩ
4.7 kΩ
+30 V

AUTOMATIC TARGET CONTROL SYSTEM FOR A TELEVISION CAMERA TUBE

FIELD OF THE INVENTION

This invention relates to automatic target control systems for television camera tubes, in general, and to such systems for maintaining the peak-to-peak amplitude of developed video signals substantially constant over a wide range of object illumination level and scene content.

BACKGROUND OF THE INVENTION

Pending U.S. Pat. Application Ser. No. 257,412, filed May 26, 1972, and entitled "TELEPHONE IMAGE TRANSMISSION SYSTEM" (RCA 64,997) describes a system which is capable of transmitting still television pictures of three-dimensional objects over communications channels such as long-distance, unequalized voice-grade telephone lines. A television camera is therein employed to continually provide a video signal to a storage tube in which any one video frame of information can be "frozen." The single frame stored—i.e., the picture to be transmitted —is then converted to an audio frequency signal for transmission over telephone type communications links to a remote receiver location, where a second storage tube is used to store the audio frequency information transmitted. Upon completion of the transmission, the audio information stored at the receiver is converted back to a video signal for viewing on a monitor. The transmitted signal is essentially frequency modulated, in that its instantaneous frequency is directly proportional to the brightness level of the stored picture element then being transmitted.

Such a transmission system has been termed "simplex," in that transmissions always travel in the same direction along the telephone link. In a "half-duplex" system, on the other hand, transmissions can proceed in either direction, but not simultaneously. Experimentation has shown that system performance can be enhanced by maintaining the peak-to-peak amplitude of the video signals developed by the television camera within prescribed limits for application to the succeeding processing stages. Experimentation has also shown that the more usual camera control of maintaining the average value of developed signals constant is not totally satisfactory in this type of system employing storage tubes and telephone lines for the transmission and reproduction of image information.

For example, it has been noted that the automatic control signals developed for the television camera tube with average detection can result in the reproduction of different intensities of "white" in successive television frames as the amount of white content in the object scenes vary. That is, because the detector provides a target control voltage of a magnitude dependent upon the average brightness of an illuminated object, changing the televised scene from one of high brightness to one of low brightness could correspondingly alter that control voltage to reduce the intensity of white information reproduced for that low brightness scene, and vice versa. Although average detection is acceptable in real-time television systems where reproduced scenes are constantly changing, it is somewhat less desirable in storage tube systems where adequate bases of reference exist by which different degrees of white reproduction can be easily compared. Those differences in white which would not otherwise be viewable because of the integration characteristics of the human eye can be readily perceived where different frames of video information are frozen for continuous viewing over extended periods of time.

With storage tube arrangements of the type used in the above-described transmission system, it is not uncommon for the single frame of video information frozen to be viewed for up to 15 minutes and more. If an average detection type of target control system were employed, differences in the reproduced intensity of white in the next succeeding frame frozen would be easily perceived if the two scenes had substantially different percentages of brightness content. Thus, depending upon the direct current reference against which the average value for the video signal is to be compared and the percentage of white information in the televised scene, white could be reproduced as a shade of gray in low brightness scenes and as a shade of "super-white" in high brightness scenes. It will be readily apparent that the optimum transmission of monochrome information by telephone lines, as in the Ser. No. 257,412 system, is fostered when all intensities of white are reproduced at the same level—regardless of whether the object scene represents a window of white information in a black background field or a black window in a white background field, for example.

SUMMARY OF THE INVENTION

As will become clear hereinafter, the present invention comprises an automatic target control system which utilizes peak detection to maintain constant video signal amplitudes over wide ranges of object illumination. Furthermore, in order to ensure that substantially all intensities of white information will reproduce at the same level, a low impedance driving source is used for the detector. By selecting the time constant for the peak detection based on this low impedance, the control voltage for the target will be developed very quickly, such that even narrow areas of white in a scene will be correctly reproduced. It thereby becomes possible to stabilize the intensity of white in the reproduced image on scenes having as little as 3–5% of its object area illuminated.

BRIEF DESCRIPTION OF THE DRAWING

These and other features of the present invention will be more clearly understood from a consideration of the following description taken in connection with the accompanying drawing which shows a preferred embodiment of an automatic target control system constructed in accordance with the invention.

DETAILED DESCRIPTION OF THE DRAWING

The television camera tube of the drawing is represent by the reference numeral 10, and comprises an envelope 12, a control grid 14, a cathode 16, and accelerating anode 18, a focusing electrode 19, a collector mesh 21, and a target 20 from which an output signal is developed at a terminal 22. The camera tube 10 may be of appropriate vidicon structure, and provides its developed output signal representative of the scene televised to a preamplifier stage 24 via an included capacitor 26. A first transistor 28 amplifies the signal from preamplifier 24, and to this end incorporates a resistor 32 to couple its collector electrode to a source of operating potential $+V_1$. The base electrode of transistor 28 is directly connected to the output of the preamplifier 24, while the emitter electrode of the transistor is coupled, first, by a resistor 34 to a point of reference or ground potential and, second, by the series combination of a capacitor 36 and a resistor 38 to that same point, these connections being employed, in part, to provide a high frequency peaking to the amplified signal to compensate for the frequency roll off of the vidicon and the preamplifier.

Three transistors 40, 42 and 44 are additionally illustrated. The base electrode of transistor 40 is coupled to the collector electrode of transistor 28 via a resistor 46 and a capacitor 48, with a further resistor 50 being coupled between the base electrode and ground to provide the bias necessary to establish the desired signal swing for the peak detection. As shown, a further resistor 52 couples the collector electrode of transistor 40 to the $+V_1$ source while a resistor 54 couples the emitter electrode of transistor 40 to ground, a capacitor 56 serving to decouple resistor 54 for alternating frequencies. Feedback for the amplifier stage thus formed is provided by a resistor 56 connected between the collector and base electrodes of the transistor 40. In a preferred embodiment of this invention, both transistors 28 and 40 were selected of N-P-N type configuration, and resistor 52 was selected variable to act as an automatic target control potentiometer.

As was previoulsy mentioned, the control system of the invention incorporates a peak-to-peak detector instead of the more usually employed average detector. The peak detector may be of conventional construction, utilizing a pair of capacitors 58 and 60 and a pair of semiconductor rectifiers 62 and 64. With the anode electrode of rectifier 62 grounded and its cathode electrode at the junction formed between the connection of capacitor 58 with the anode electrode of rectifier 64, the peak detector is completed by the coupling of the capacitor 60 between the cathode electrode of rectifier 64 and ground, and by the connecting of that cathode electrode to the base electrode of the transistor 44.

Considering transistor 44, it will be seen that a resistor 66 couples its emitter electrode to ground while a resistor 68 references its base electrode to ground potential. A further resistor 70 couples the collector electrode of transistor 44 to a second source of operating potential $+V_2$, with a pair of resistors 72, 74 also serving to couple that collector electrode, this time, to the vidicon target output terminal 22. With a capacitor 76 coupled between the junction of resistors 72 and 74 and ground potential, the automatic target control system of the drawing is completed by the inclusion of a low impedance emitter follower circuit driving the peak detector.

To this end, the emitter electrode of transistor 42 is coupled by a resistor 78 to a point of reference potential and to the plate of capacitor 58 which is remote from its junction with rectifiers 62, 64. As shown, the collector electrode of transistor 42 is also directly connected to the $+V_1$ potential source, and its base electrode is connected to the variable arm of potentiometer 52. Transistors 42 and 44 are also illustrated as being of N-P-N type configuration.

As will be readily apparent, the construction of the drawing comprises a preamplifier stage direct current coupled to a high-frequency peaking stage, from which a wide band collector video signal is sampled and applied to the base of an amplifier transistor 40. This transistor amplifies and inverts the signal applied to its base electrode, to provide an output which is emitter follower coupled to the peak-to-peak detector. With the amplified video signal appearing at the emitter electrode of transistor 42, the peak-to-peak detector produces a direct current voltage at the base electrode of transistor 44 which is directly proportional to the amplitude of the output video signal provided at terminal 30 to the succeeding processing stages of the camera tube circuitry. Transistor 44, in this embodiment, is a direct current amplifier that controls the vidicon target biasing voltage in accordance with the amount of collector current flowing through it.

As will be seen, the automatic target sensitivity control potentiometer 52 can be adjusted to establish a direct potential at the collector electrode of transistor 44 as to produce a vidicon target voltage that will yield a substantially 1.0 volt peak-to-peak signal at output terminal 30. Assuming this to be the video signal desired, any subsequent decrease in its peak-to-peak amplitude (e.g., due to a drop in object illumination level) would produce a resultant decrease in the base bias voltage of transistor 44, but would cause the collector electrode direct voltage to increase the vidicon target voltage. Such action would increase the target signal current, and the signal developed at the collector electrode of transistor 28 such that, with proper loop gain, the network will stabilize at the 1.0 volts peak-to-peak signal amplitude at output terminal 30.

If the output signal should increase in peak-to-peak amplitude, on the other hand (e.g., due to an increase in object illumination level or due to a reduction in vertical scan rate), the base bias voltage of transistor 44 would increase, thereby decreasing its collector electrode direct voltage to reduce the vidicon target voltage. The target signal current would be thusly decreased, resulting in a lowering of the peak-to-peak signal amplitude at the collector electrode of transistor 28, until the network will stabilize once again at the 1.0 volt peak-to-peak output signal.

As so far described, the operation might not appear very much different whether the emitter follower transistor 42 were in or were out of the circuit illustrated. Such transistor, however, serves to remove averaging effects in order that the white signal amplitudes remain constant for varying coverages of brightness information in the object scene.

To be more specific, it will be appreciated that capacitor 60 in the peak detector will charge up when the signal at the collector electrode of transistor 28 extends in the white direction sufficiently to cause transistor 40 to conduct and overcome the forward voltage drop on rectifier 64. Without the transistor 42, this capacitor will charge through the potentiometer 52 towards the $+V_1$ supply voltage. However, for different area coverages of white information in any given scene, the voltage to which capacitor 60 would charge would depend, not only upon the extent of the white information interval, but also upon the time constant formed by it with the potentiometer resistance. In other words, for small brightness scenes, capacitor 60 could charge to a different voltage representative of white information than it could charge to for larger brightness scenes, even though the intensity of white information were the same on all scenes. The result of such operation, without the emitter follower transistor 42, would then be that different target voltage compensations would occur for different brightness area scenes.

With transistor 42, on the other hand, capacitor 60 will charge towards the $+V_1$ supply voltage with a time constant dependent upon the output impedance at the emitter electrode of transistor 42, rather than upon the resistance of potentiometer 52. As that impedance is quite low, the capacitor will charge to the voltage to reproduce white in the image in a much shorter time—to the extent that white information in the scene will produce comparable base bias voltages for transistor 44 whether the coverage of white information be 25%, 50%, 75%, or more. Experimentation has shown that substantially the same base bias voltage—and, therefore, the vidicon target compensating voltage—to reproduce white will be developed for all scenes in which the area of white content exceeds some 3–5% of the object scene. The alternative approach of reducing the resistance of the automatic target control potentiometer 52 without transistor 42 is much less desirable in that current flows from the $+V_1$ power supply would be drastically increased and a more expensive, high current handling transistor 40 would be required. Resistance 52 is selected variable to adjust the direct current voltage on the vidicon target to produce the desired output signal amplitudes with camera tubes of differing reproduction characteristics.

While there has been described what is considered to be a preferred embodiment of the present invention, it will be apparent that modifications may be made without departing from the scope of the teachings herein. Furthermore, it will also be appreciated that the present invention is attractive not only in instances where it is desired to maintain a stabilized output signal amplitude as object illumination levels vary. As was previously noted, the automatic signal level control system would operate in the manner described where signal amplitudes at the collector electrode of transistor 28 would vary as a function of vertical scanning rate. The Ser. No. 257,412 application describes an arrangement in which the vertical scanning rate is changed from 60 Hz to reduced scanning rates for differing modes of television image system operation. It will be readily seen that the described signal control system of this invention will operate substantially as described for that sequence of events as well as for changes in object illumination level as described above, in that the capacitor of the peak detector will continue to charge to its $+V_1$ supply voltage with sufficient rapidity to alter target bias voltage in stabilizing to the video output signal amplitude.

What is claimed is:

1. In an automatic control system for a television pickup tube of the type in which a characteristic of the output signal developed is sampled to provide a control voltage representative of undesired changes thereof for use in biasing a target electrode of said pickup tube in a direction to stabilize said characteristic, the combination therewith of:

a first amplifier having an output terminal at which a relatively low impedance is presented;

detector means coupled to said output terminal providing a direct current output voltage proportional to the peak-to-peak amplitude of an applied input signal;

means coupling the output signal developed by said television pickup tube to an input terminal of said first amplifier; and a second amplifier responsive to said direct current output voltage from said detector means for providing said control voltage to said target electrode in stabilizing the peak-to-peak amplitude of said pickup tube output signal at a predetermined level.

2. The combination of claim 1 wherein said detector means includes a first capacitor cooperating with the low impedance presented at the output terminal of said first amplifier to provide a time constant network such that a direct voltage is developed across said capacitor representative of the peak-to-peak amplitude of said pickup tube output signal.

3. The combination of claim 2 wherein said first amplifier includes a transistor having an output emitter electrode coupled to said detector means and an input base electrode coupled to receive said pickup tube output signal, with said transistor being arranged in an emitter follower amplifier configuration.

4. The combination of claim 3 wherein said second amplifier includes a second transistor having an input base electrode coupled to receive the direct voltage from said detector means and an output collector electrode coupled to the target electrode of said television pickup tube, with said second transistor being arranged in a grounded emitter amplifier configuration.

5. The combination of claim 4 wherein the first capacitor of said detector means is coupled between the base electrode of said second transistor and a point of reference potential, wherein said detector means also includes first and second rectifiers serially coupled in the same polarity between said point of reference potential and the base electrode of said second transistor, and wherein said detector means further includes a second capacitor coupled between the junction point of said first and second rectifiers and the emitter electrode of said first transistor.

* * * * *